(12) United States Patent
Niwa

(10) Patent No.: US 6,371,426 B1
(45) Date of Patent: Apr. 16, 2002

(54) HOLDER OF A ROD-SHAPED MEMBER

(75) Inventor: Kenji Niwa, Nagoya (JP)

(73) Assignee: Maruzen Products Company Limited, Aichi-ken (JP)

( * ) Notice: Subject to any disclaimer, the term of this patent is extended or adjusted under 35 U.S.C. 154(b) by 0 days.

(21) Appl. No.: 09/722,402

(22) Filed: Nov. 28, 2000

(30) Foreign Application Priority Data

Aug. 2, 2000 (JP) ........................................ 2000-234853

(51) Int. Cl.$^7$ ................................................. A47H 1/16
(52) U.S. Cl. .................................. 248/302; 248/229.16
(58) Field of Search ................................. 248/317, 302, 248/305, 313, 316.7, 205.1, 229.16

(56) References Cited

U.S. PATENT DOCUMENTS 4,909,467 A * 3/1990 Shan-Pao ..................... 248/312
5,088,609 A * 2/1992 Fryc ........................ 248/316.7 X
5,116,003 A * 5/1992 Gerhardt ..................... 248/312
5,577,699 A * 11/1996 Gardner et al. ............ 248/218.3

FOREIGN PATENT DOCUMENTS

JP    10286149 A    10/1998

* cited by examiner

Primary Examiner—Ramon O. Ramirez
(74) Attorney, Agent, or Firm—Armstrong, Westerman & Hattori, LLP

(57) ABSTRACT

A wire holder 1 is provided with a wire support member 10 and a cap member 20, and a wire 5 is inserted in a wire grasping part 14 of the wire support member 10 and is held. The wire grasping part 14 has a spiral part 142 where a linear member 140 in two lines is wound in coil shape, and an acting part 16 integrally connected to the spiral part 142 is rotated thereby the spiral part 142 is reduced in the diameter and the wire 5 is grasped. The acting part 16 is engaged with the cap member 20, and the cap member 20 is constituted to be rotated about the axial center thereby the acting part 16 is rotated. Further the spiral part 142, in the diameter reduced state, engages the diameter reduction position holding part 18 and the cap member 20 thereby the grasped wire 5 can be held.

4 Claims, 6 Drawing Sheets

B view direction

HOLDER OF A ROD-SHAPED MEMBER

BACKGROUND OF THE INVENTION (1) Field of the Invention

The present invention relates to a holder of a rod-shaped member wherein in order to hold a rod-shaped member to an installed member, the holder is constituted so that it can connect the rod-shaped member and the installed member. For example, the invention relates to a holder of a rod-shaped member such as a rod-shaped member to support display cards of articles arranged at the shop front or a long rod-shaped member similar to this or the like. In addition, the rod-shaped member described here includes the metallic member, the resin material or a flexible member such as resin material or a flexible member such as a rope or a string.

(2) Description of the Related Art

In the prior art, a holder which holds a rod-shaped member in order to support a display card of an article is constituted so that a part of the outer circumferential surface of the rod-shaped member is grasped. For example, a holder of a rod-shaped member shown in JP-A 10-286149 is constituted as shown in FIG. 10, by a first support member 31 subjected to elastic deformation, and a second support member 32 into which the first support member 31 is fitted, and rod-shaped member 33 with one end bent in a dog-leg 33a is inserted in a through hole 34 of the first support member 31. The member of the dog-leg 33a is pressed to an inner circumferential wall 35 around the through hole 34, thereby the rod-shaped member 33 is fixed. Also a holder of the rod-shaped member 40 shown in FIG. 11 is constituted by a support member 42 which supports a rod-shaped member 41 by inserting it thereinto, and a cap member 43 into which the support member 42 is fitted in the diameter reducible state. In the support member 42, slits 44 are formed in cross shape and support pieces 45 divided in four are arranged in that the rod-shaped member 41 is inserted at the center and each support piece 45 has a taper surface 45a on the outer circumferential surface. The cap member 43a with a taper 43a formed on the inner surface is fitted so as to cover the support member 42 thereby each support piece 45 is deformed so that its diameter is reduced to the side of the inserted rod-shaped member 41 thus the rod-shaped member 41 is fixed.

Consequently, in the holder of the rod-shaped member 30 shown in FIG. 10, the rod-shaped member 33 is held by the top end part on the member of the dog-leg 33a abutting on the inner circumferential wall 35 and the bent part at the opposite side of the top end part. Also in the holder of the rod-shaped member 40 shown in FIG. 11, the diameter is reduced thereby the rod-shaped member 41 is held at four points on the top end part of respective support pieces 45 divided in four. Therefore in any of FIGS. 10 and 11, the rod-shaped member is held in the point contact state.

In the holder of the rod-shaped member 30 shown in FIG. 10, however, since the rod-shaped member 33 must be bent in the dog-leg 33a in conformity with the through hole 34 of the first support member 31, the special rod-shaped member must be manufactured therefore the cost becomes high. Also since the rod-shaped member 33 must be bent in the dog-leg 33a in conformity with the through hole 34 of the first support member 31, the special rod-shaped member must be manufactured therefore the cost becomes high. Also since the rod-shaped member 33 is held in the point contact state, the contacting area to hold the rod-shaped member is small, therefore grasping force to rod-shaped member is weak, a problem exists in that the first support member 31 is liable to be detached from the first support member 31. Further when the first rod-shaped member is detected, the first support member 32 will be harmed by the top end part of the dog-leg 33a.

Also in the holder of the rod-shaped member 40 shown in FIG. 11, since the rod-shaped member 41 is pressed at the four points on the top end part of the respective support pieces 45 deformed so that the diameter is reduced, the contacting area to hold the rod-shaped member 41 is small therefore the holding force of the rod-shaped member 41 is weak. Moreover, since the rod-shaped member 41 to be inserted in the center part of the slits 44 of cross shape is liable to be deviated from the center part, there is a defect in that the rod-shaped member 41 can not be sufficiently held.

SUMMARY OF THE INVENTION

In order to solve the above-mentioned problems in the prior art, an object of the present invention is to provide a holder of the rod-shaped member constituted in that the contacting area to grasp the rod-shaped member is made large thereby the rod-shaped member can be held firmly to the holder of the rod-shaped member.

That is, a holder of the rod-shaped member according to the present invention connects a rod-shaped member to an installed member, in order to hold the rod-shaped member to the installed member, said holder of the rod-shaped member comprising first support means which supports the rod- shaped member, and second support means which acts so that the rod-shaped member can grasped to the first support means, wherein the first support means comprises a rod-shaped member grasping part having grasping means with the diameter to be reduced by twisting, an acting part connected to the rod-shaped member grasping part for acting so that the rod-shaped member grasping part can be reduced in the diameter, and a diameter reduction position holding part which holds the rod-shaped member grasping part at the diameter reduced position, the second support member is formed so as to be engaged with the acting part and the diameter reduction position holding part of the first support means, and the rod-shaped member is arranged to be inserted within the grasping means with the diameter reduction by twisting, and the rod-shaped member is rotated by the second support means thereby the grasping means with the diameter reduction by twisting is reduced in the diameter and the rod-shaped member can be grasped.

In a holder of the rod-shaped member according to the present invention, a rod-shaped member is inserted within grasping means with diameter reducing by twisting of a rod-shaped member holding part, and the acting part of the first support means is engaged with second support means, and then the second support means is rotated in one direction thereby the acting part is rotated and the grasping means with the diameter reducing by twisting is twisted thereby the grasping means with the diameter reducing by twisting is reduced in the diameter. Therefore the rod-shaped member inserted within the rod-shaped member grasping means with the diameter reducing by the twisting is grasped by the diameter reducing of the diameter reducing means by the twisting. Since the grasping means with diameter reducing by twisting grasps the outer circumferential surface of the rod-shaped member in the whole circumferential surface of the formed grasping means with diameter reducing by the twisting, the grasping contacting area can be made large and the rod-shaped member can be grasped firmly. Consequently the rod-shaped member can not be easily detached from the first support means.

Since a rod-shaped member grasped by the grasping means with the diameter reducing by twisting is engaged by the second support means and the diameter reducing position holding part, the rod-shaped member is held at the diameter reducing position and is held to the installed member.

More preferably if the grasping means with the diameter reducing by twisting is formed by a spiral part, for example, even if the rod-shaped member is formed in small diameter, since a part of the rod-shaped member corresponding to length formed in spiral shape in the spiral part is grasped throughout the whole circumferential surface, the rod-shaped member can be firmly held to the installed member.

More preferably if the grasping means with the diameter reducing by twisting is formed by a spiral part, for example, even if the rod-shaped member is formed in small diameter, since a part of the rod-shaped member corresponding to length formed in spiral shape is grasped throughout the whole circumferential surface, the rod-shapes member can be firmly held to the holder of the rod-shaped member.

Further it is preferable that if the spiral part is formed in a linear member wound in two lines, the grasping contacting area to grasp the rod-shaped member can be made further larger, and the rod-shaped member can be grasped further firmly.

Also in the first support means, if the engaging part with the installing member is formed to the side of the grasping part of the anti rod-shaped member, the holder of the rod-shaped member is interposed and the rod-shaped member can be held to the installed part.

DESCRIPTION OF PREFERRED EMBODIMENTS

An embodiment of the present invention will be described based on the accompanying drawings as follows. A holder of the rod-shaped member in this embodiment mainly holds a wire made of metal to support a display card or a rod-shaped member similar to the wire. The holder of the rod- shaped member shall be referred to as "a wire holder 1". In addition, a wire to be hereinafter described is formed in long shape, and includes that formed in round rod shape, square rod shape or linear shape, or that bent at upper side and formed in L-like shape or U-like shape. Further the amount of the wire diameter offers no problem.

Figure 1:
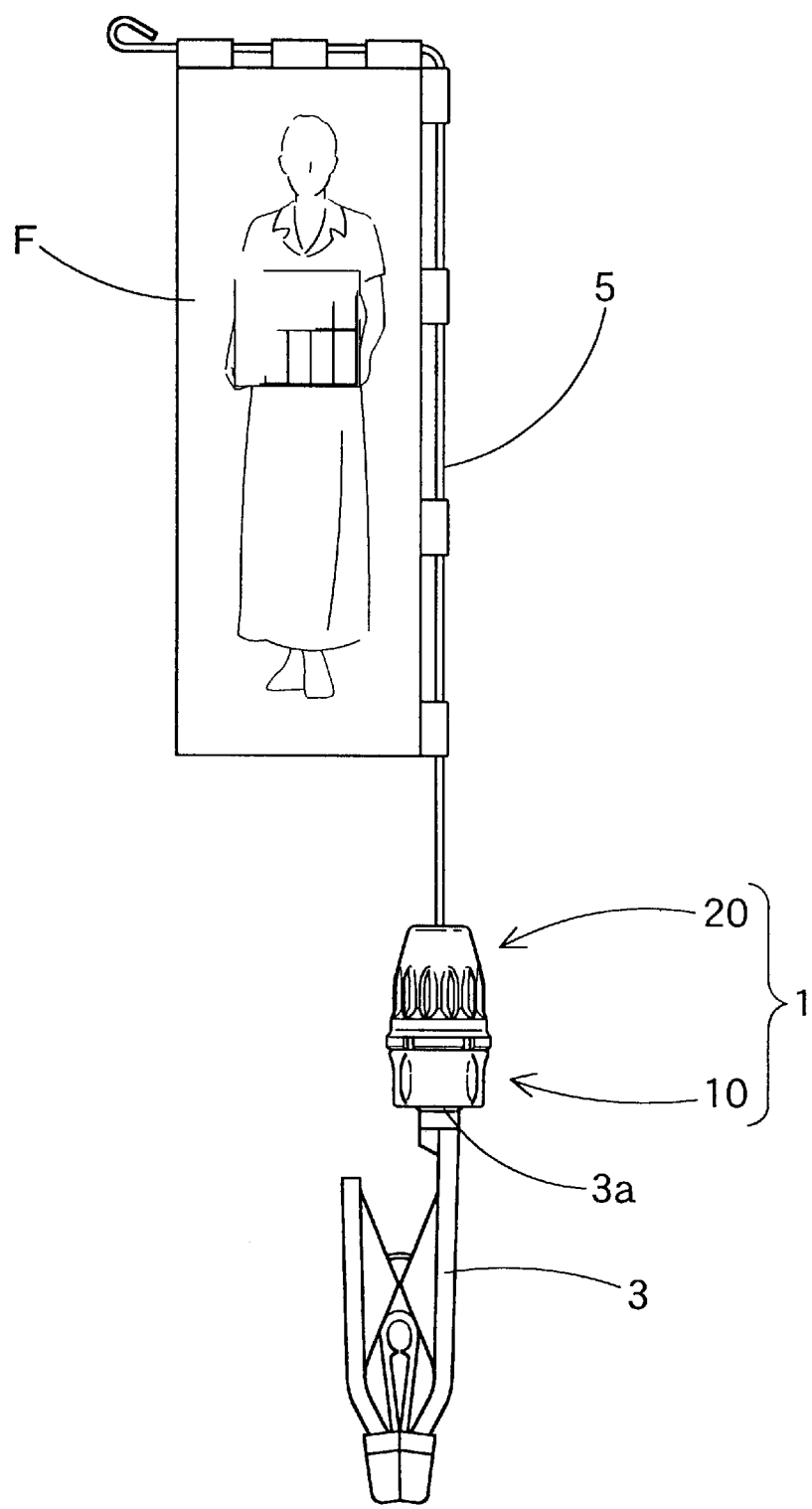
FIG. 1 is a front view showing state that a wire and a base plate are connected by a wire holder of the invention.

A wire holder 1 in the embodiment, as shown in FIG. 1, is provided at one side with a base member (in this figure example, a clip to be mounted on a pipe or the like) 3 to be held on an installed member, and at other side with a wire 5 held in rod shape, and the wire holder 1 is used as a connection member, to be connected a display card to the base member 3. In this figure example, the wire 5 is formed in L-like shape, and a flag F as a display card is installed on the wire 5. Of course, the invention is not limited to this.

The wire holder 1 comprises a wire support member 10 as a first support member, and a cap member 20 as a second support member. The wire 5 inserted from the side of the cap member 20 is grasped by the wire support member 10.

Figure 2:
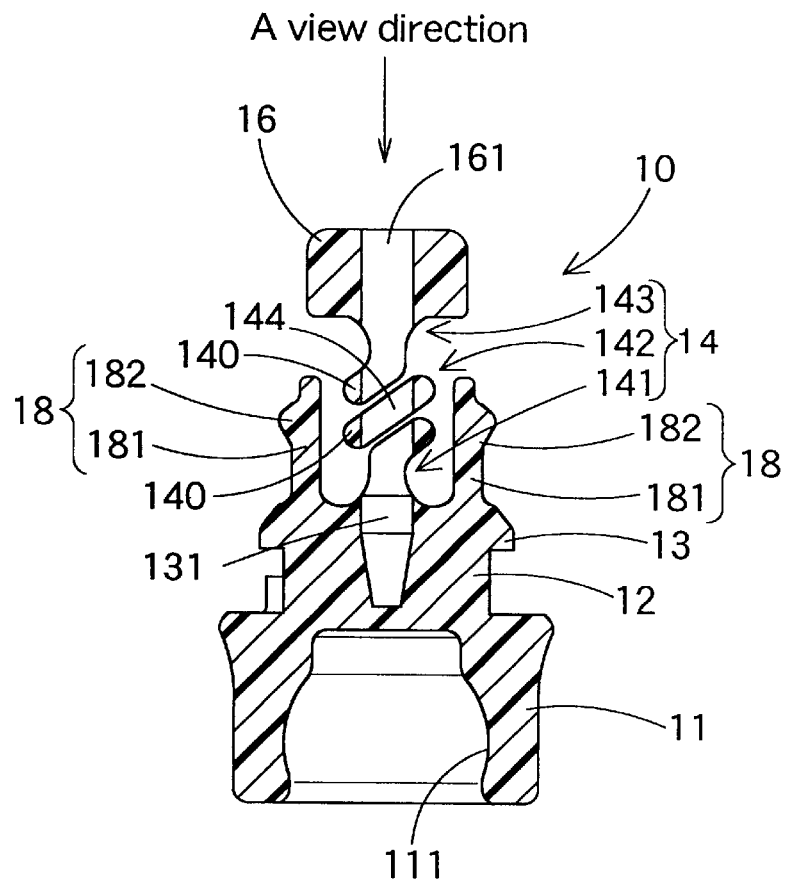
FIG. 2 is a sectional view showing a wire support member of a wire holden. in an embodiment of the invention.
Figure 3:
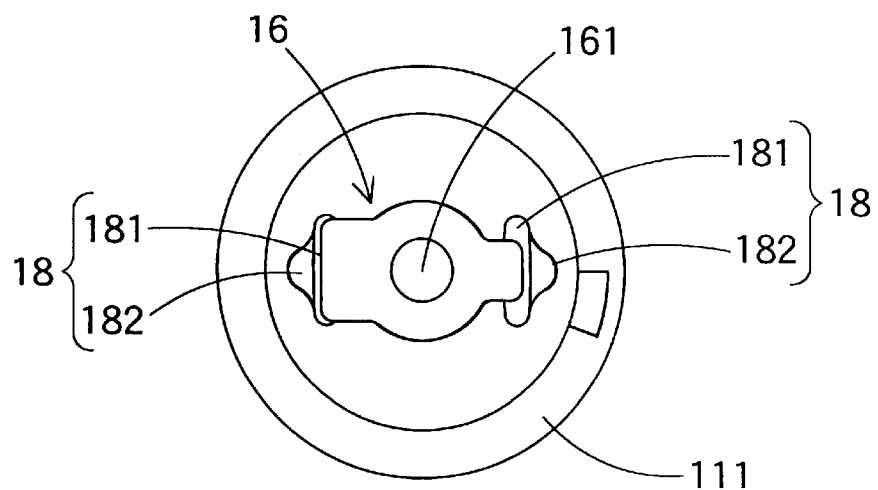
FIG. 3 is a view from A arrow direction in FIG. 2.
Figure 4:
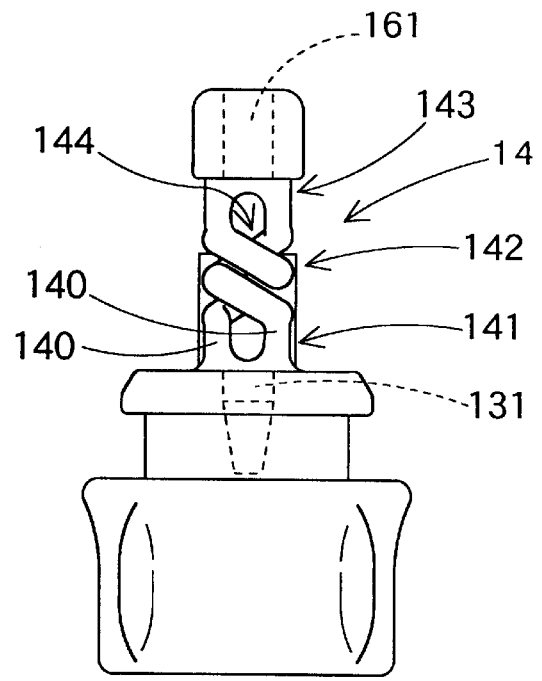
FIG. 4 is a fragmentary sectional view showing a spiral part in FIG. 2.

The wire support member 10 is made of resin and can be deformed in elastic deformation and is preferably formed, for example, by injection molding. As shown in FIGS. 2 to 4, the wire support member 10 comprises a basic part 11 with one end opened, a guide part 13 connected to the basic part 11, a wire grasping part 14 extending along the axial center of the guide part 13 from the other end of the guide part 13, an acting part 16 engaged with a cap member 20 at the top end of the wire grasping part 14 and acting so as to reduce the diameter of the wire grasping part 14, and a pair of diameter reducing position holding parts 18 extending from both edge parts at the other end of the guide part 13 interposing the wire grasping part 14 for holding the wire grasping part 14 at the diameter reducing position.

The basic part 11 is formed to be connected to the base member 3. The basic part 11 in the embodiment has a spherical recess 111 opened from one end (refer to FIG. 2) so that a spherical part 3a formed on the base member 3 is engaged. The engagement of the basic part 11 with the base member 3 by the spherical surface is performed in that the wire holder 1 is arranged to be rotated in multiple directions to the basic member 3. As long as the moving direction is restricted, the engagement is not limited to the engagement by the spherical surface, but the engagement by the round shaft, the engagement by the square shaft or the engagement by the screw may be used. In any case, the engaging part of the basic part 11 is formed by the shape of the engaging part formed on the base member 3.

The other end of the basic part 11 is connected in that the guide part 13 of larger diameter is formed in flange shape through the small diameter part 12 with diameter smaller than the outer diameter of the basic part 11. The outer circumferential surface of the guide part 13 is formed capable of abutting on the inner circumferential surface of the cap member 20, and the guide is performed so that the wire support member 10 and the cap member 20 are coincident in the axial center. At the other end of the guide part 13, an insertion hole 131 for inserting the wire 5 is formed extending along the axial center to the position immediately before penetrating to the spherical recess 111.

The wire grasping part 14 extending from the axial center part of the guide part 13 is twisted by the rotation of the acting part 16 therefore its diameter is reduced. It is preferable that the wire grasping part 14 grasps the outer circumferential surface of the wire 5 widely and the grasping forth is made large. In the embodiment, as shown in FIG. 2 and FIG. 4, the wire grasping part 14 is constituted by a pair of linear members 140, 140. The wire grasping part 14 is provided with a first linear part 141 connecting each one end of a pair of the linear members 140, 140 so as to extend from the end surface of the guide part 13 at the position far from the axial center, a spiral part 142 wound in shape of two coils for acting as twisting diameter reducing grasping means, and a second linear part 143 connecting the other end of a pair of the linear members 140, 140 to the acting part 16 at the position far from the axial center. Also the portion between a pair of linear members 140, 140 is formed as a wire insertion hole 144 leading to the insertion hole 131 of the guide part 13.

The acting part 16 is connected to the second linear part 143 of the wire grasping part 14, and is provided at the center part with a through hole 161 leading to the wire insertion hole 144. As shown in FIG. 3, the acting part 16 is formed in substantially long plate shape with the outer circumference of the center part formed in circular arc shape. Consequently the acting part 16 in substantially long plate shape is rotated about the axial center, thereby the spiral part 142 connected to the acting part 16 is made in diameter reducing or diameter enlarging with respect to the wire insertion hole 144.

The diameter reducing position holding part 18, interposing the wire grasping part 14, is formed having a pair of plate-shaped walls 181, 181 rising from the end surface of the guide part 13 at the inside from the outer circumferential surface of the guide part 13. At a pair of the walls 181, 181, small diameter projecting parts 182, 182 respectively projecting outward are formed and arranged to be engaged with the cap member 20.

Figure 5:
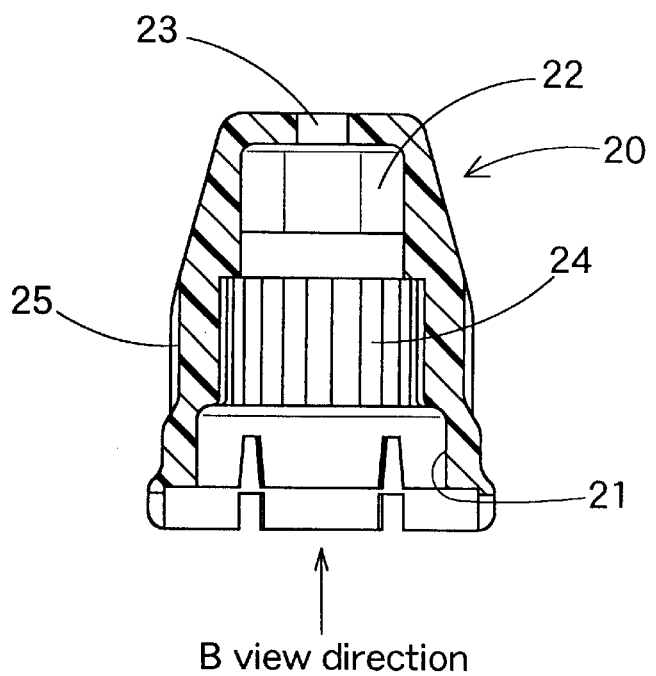
FIG. 5 is a sectional view showing a cup member of a wire holder, in an embodiment of the invention.
Figure 6:
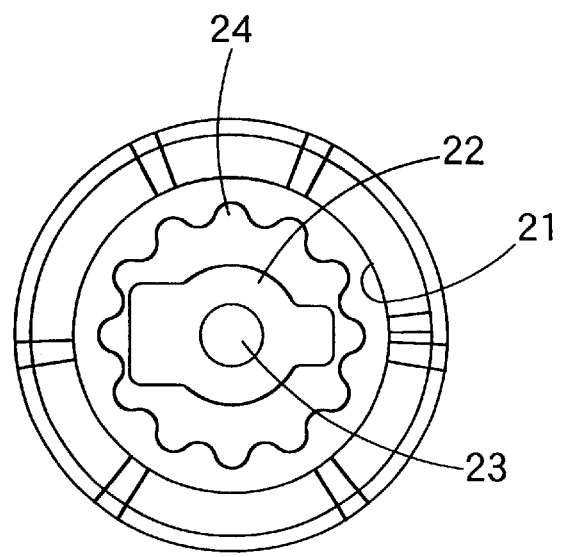
FIG. 6 is a view from B arrow direction in FIG. 5.

The cap member 20 is made of resin similar to the wire support member 10 and is preferably formed, for example, by injection molding. As shown in FIGS. 5 to 6, the cap member 20 is formed from the side of the acting part 16 of the wire support member 10 in cup shape opened at the side of the guide part 13 so as to cover the guide part 13. The inner circumferential surface of the origin part side (the side of the guide part 13 in the state coupled with the wire support member 10) of the cap member 20 is formed as a guide surface 21 on which the outer circumferential surface of the guide part 13 abuts, and at the top end part side (the side of the acting part 16 in the state coupled with the wire support member 10), an engaging recess 22 (refer to FIG. 6) in similar shape to the acting part 16 is formed in order that the acting part 16 of the wire support member 10 is fitted in. In the inside of the intermediate part arranged between the origin part side and the top end part side, a number of longitudinal grooves 24 are formed along the axial direction, so that a small diameter projecting part 182 of the wire support member 10 can be coupled with any of the longitudinal grooves 24.

Also at the end surface of the top end part of the cap member 20, a wire insertion hole 23 is formed in which the wires is inserted, and on the outer circumferential surface, a number of longitudinal projecting parts 25 are formed so that the cap member 20 can be easily rotated and operated by hand.

Figure 8:
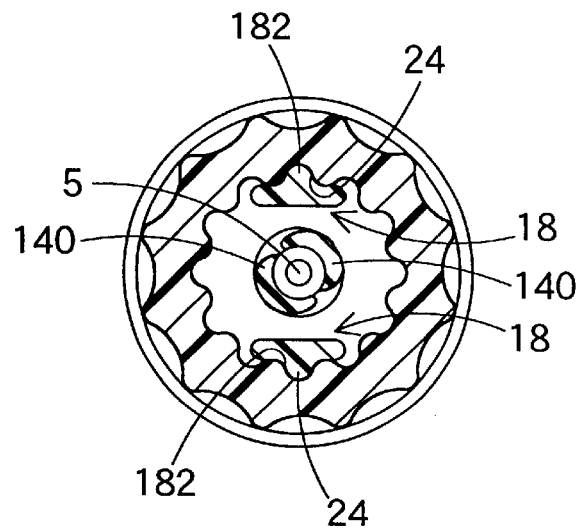
FIG. 8 is a sectional view taken on line VIII—VIII in FIG. 7.
Figure 9:
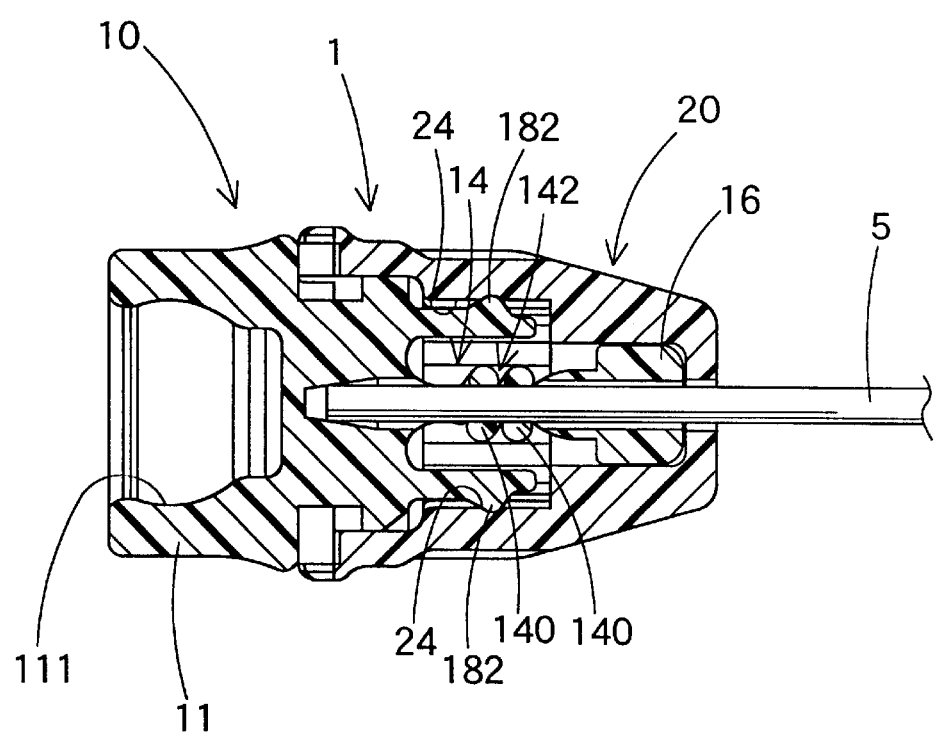
FIG. 9 is a sectional view showing state that a spiral part of a wire holder is reduced in diameter and a wire is inserted.
Figure 10:
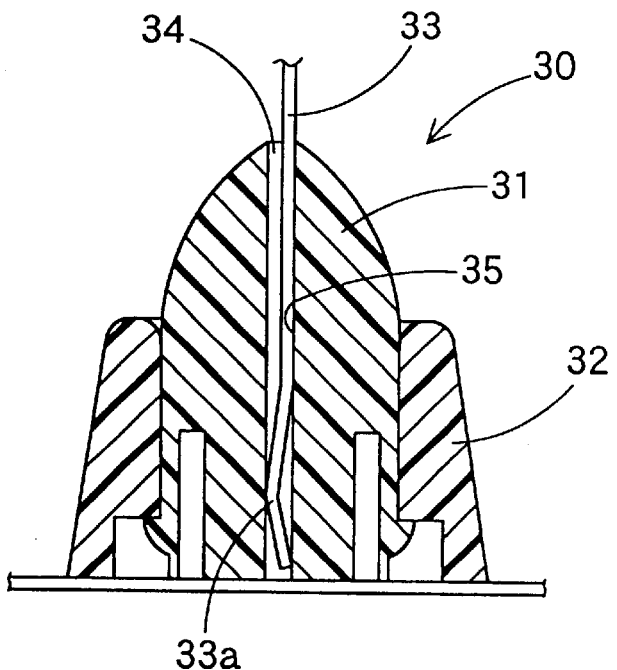
FIG. 10 is a schematic view showing a holder of the rod-shaped member in the prior art.
Figure 11:
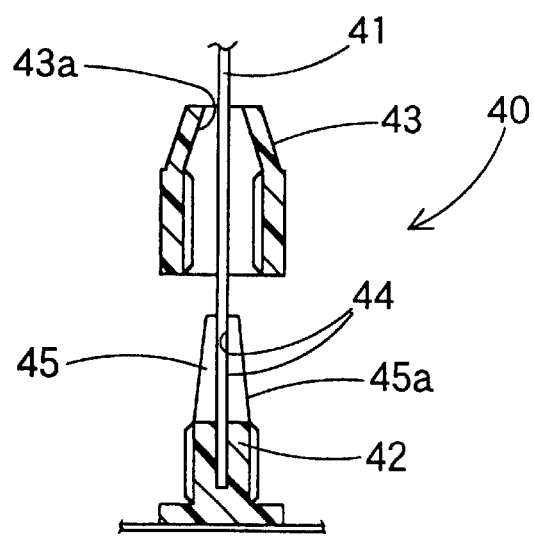
FIG. 11 is a schematic view showing another holder of the rod-shaped member in the prior art.

Next, function of the wire holder 1 constituted as above described will be described based on FIGS. 7 to 9.

First, the cap member 20 is fitted into the wire support member 10. In this case, the cap member 20 is aligned to the position where the acting part 16 of the wire support member 10 and the engagement recess 22 of the cap member 20 are coincident in shape, and then is inserted from the origin part side of the cap member 20 so that the guide part 13 of the wire support member 10 is covered. In this state, the insertion hole 131 of the guide part 13, the wire insertion hole 144 of the wire grasping part, the through hole 161 of the acting part 16 and the wire insertion hole 23 of the cap member 20 are positioned concentrically. Also a pair of small diameter projecting parts 182, 182 of the diameter reducing position holding part 18 are engaged with any of the longitudinal grooves 24 formed on the cap member 20 (refer to FIG. 8).

Figure 7:
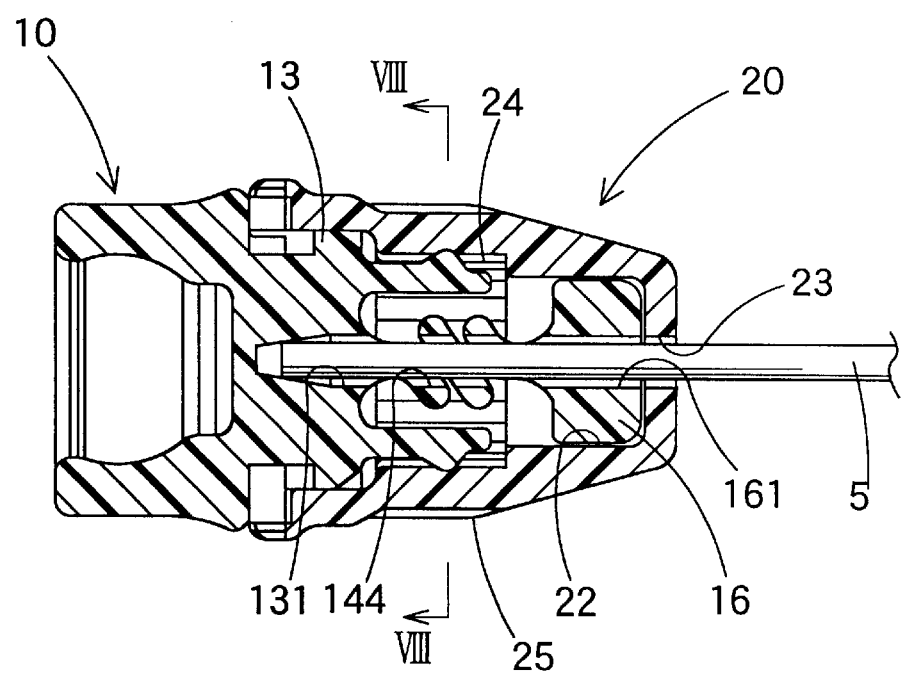
FIG. 7 is a sectional view showing state that a wire is inserted into a wire holder of the invention.

Next, as shown in FIG. 7, the wire 5 is inserted from the wire insertion hole 23 of the cap member 20 to the insertion hole 131 of the guide part 13. Each hole is formed in larger diameter than the wire 5 and the wire 5 can be easily inserted.

If the wire 5 is inserted, hand is touched to the longitudinal projecting part 25 of the cap member 20, and the cap member 20 is rotated in one direction with respect to the axial center. Then as shown in FIG. 9, since the acting part 16 of the wire support member 10 engaged with the engaging recess 22 of the cap member 20 is rotated around the wire 5, the two linear members 140, 140 of the wire grasping part 14 arranged far from the axial center are twisted with respect to axial center. By the twisting, the spiral part 142 is tightened and subjected to diameter reducing and grasps the outer circumferential surface of the outer circumferential surface of the wire 5. The spiral part 142 is formed having definite length, and using the linear member 140 formed in coil shape presses the whole circumferential surface of the wire 5 in spiral shape, the contact area of the grasping surface to the wire 5 is formed within the length of spiral part 142. Therefore the spiral part 142 raises the contacting area of the grasping surface of the wire 5, and the grasping force of the wire 5 can be made strong. Moreover, since the spiral part 142 is formed in two lines, the wire 5 can be held further strongly.

On the other hand, attendant on the rotation of the cap member 20, since the longitudinal groove 24 is rotated around a pair of walls 181, 181 of the diameter reducing position holding part 18, at the position where the rotation is stopped, among a number of longitudinal grooves 24, any two longitudinal grooves 24 are engaged with the small diameter projecting parts 182, 182 and holds the position. Thereby the wire 5 is held to the wire holder 1, and prescribed base member 3 is fitted to the spherical recess 111 of the basic part 11, and if display cards are installed to the top end of the wire 5, the display cards are arranged intact on the shop front.

In addition, since the wire holder of the embodiment forms the linear member in spiral shape and grasps the prescribed width in twisting at the whole circumferential surface, in order to hold the wires 5 strongly, as long as this constitution is satisfied, the invention is not limited to the above-mentioned style. For example, the linear member may be one line or may be three lines or more. Also both ends of the spiral part 142 may be pulled thereby diameter reducing may be performed.

Also as long as it acts as the twisting diameter reducing grasping means, the constitution is not limited to the spiral part 142. For example, a plurality of slits may be formed along the axial direction on the outer circumferential surface of thin sheet wire grasping member formed in cylindrical shape so that twisting becomes easy or otherwise, the thin sheet may be wound in cylindrical shape and each end part may be formed in splitting cylindrical plate spring shape with each end part opened.

Also as spiral part 142 can be twisted, the acting part need not be formed in long plate shape but the acting part 16 may be connected separately to respective linear member 140, 140 and may be formed dividing in two. In this case, since the wires 5 is inserted between respective acting parts divided in two, the through hole 161 in the embodiment need not be particularly formed.

Also as long as the holding at the diameter reducing part of the spiral part is performed, the small diameter projecting part 182 and the longitudinal groove 24 are not limited to the above-mentioned constitution. For example, a pair of walls 181 may be formed throughout the whole circumference and the longitudinal groove may be formed and the small diameter projecting part may be formed on the inner circumferential surface of the cap member 20 or other engagement pair is, of course, possible.

As above described, in the wire holder 1 in the embodiment, the wire 5 is inserted in the spiral part 142 of the wire grasping part 14 and the acting part 16 of the wire support member 10 is coupled with cap member 20, and then the cap member 20 is rotated in one direction thereby the acting part 16 is rotated and the spiral part 142 is subjected to diameter reducing. The wire 5 installed in the spiral part 142 is grasped by the diameter reducing of the spiral part 142. Since the spiral part 142 grasps the outer circumferential surface of the wires 5 throughout the whole circumferential surface by length of the formed spiral part 142, the contacting area of grasping can be made large and the wires 5 can be grasped firmly. Consequently the wires 5 can not be easily detached from the wire support member 10. Since the wire 5 grasped in the spiral part 142 is engaged with the cap member 20 and the diameter reducing the wire 5 is held at the diameter reducing position and held to the installed member.

Also if the spiral part 142 of the wire support member 10 is formed by two linear members 140, 140, the grasping contacting area to grasp the wire 5 can be made large further and the wire 5 can be grasped firmly.

Also if the spherical recess 111 with the installing member held to the installed member to the wire support member 10 is formed at the side of the anti-wire grasping part, the wire 5 can be held to the installed member interposing the wire holder 1.

What is claimed is:

1. A holder of a rod-shaped member, wherein (a) said holder of the rod-shaped member connects a rod-shaped member to an installed member in order to hold the rod-shaped member to the installed member, said rod-shaped member comprising:

(b) first support means which supports said rod-shaped member; and (c) second support means which acts so that said rod-shaped member can be grasped to said first support means;

(d) said first support means comprises a rod-shaped member grasping part having grasping means with the diameter to be reduced by twisting, an acting part connected to said rod-shaped member grasping part for acting so that said rod-shaped member grasping part can be reduced in the diameter, and a diameter reduction position holding part which holds the rod-shaped member grasping part at the diameter reduced position;

(e) said second support means is formed so as to be engaged with the acting part and the diameter reduction position holding part of said first support means; and (f) said rod-shaped member is arranged to be inserted within the grasping means with the diameter reduction by twisting the rod-shaped member is rotated by the second support means thereby the grasping means with the diameter reduction by twisting is reduced in the diameter and the rod-shaped member can be grasped.

2. A holder of the rod-shaped member as set forth in claim 1, wherein said grasping means with the diameter to be reduced by twisting forms a spiral part.

3. A holder of the rod-shaped member as set forth in claim 2, wherein said spiral part is formed in a linear member wound in two lines.

4. A holder of the rod-shaped member as set forth in claim 1, wherein said first support means has an engaging part with the installing member held by said installed member formed at the side of the anti rod-shaped member grasping part.

* * * * *